United States Patent
Colvin et al.

(10) Patent No.: US 11,767,380 B2
(45) Date of Patent: Sep. 26, 2023

(54) SYSTEM AND METHOD FOR PROCESSING GUAYULE RUBBER

(71) Applicant: THE GOODYEAR TIRE & RUBBER COMPANY, Akron, OH (US)

(72) Inventors: Howard Colvin, Wayne, OH (US); Nicolas Sauty, Perrysburg, OH (US)

(73) Assignee: THE GOODYEAR TIRE & RUBBER COMPANY, Akron, OH (US)

(*) Notice: Subject to any disclaimer, the term of this patent is extended or adjusted under 35 U.S.C. 154(b) by 292 days.

(21) Appl. No.: 16/999,302

(22) Filed: Aug. 21, 2020

(65) Prior Publication Data

US 2021/0054115 A1    Feb. 25, 2021

Related U.S. Application Data

(60) Provisional application No. 62/890,924, filed on Aug. 23, 2019.

(51) Int. Cl.
*C08F 36/08* (2006.01)
(52) U.S. Cl.
CPC .................... *C08F 36/08* (2013.01)
(58) Field of Classification Search
CPC . C08F 36/08; C08C 1/15; B29B 7/007; B29B 7/7495; B29B 7/80; B29B 7/842; B29B 7/86; B29B 48/0022; B29B 48/022; B29B 48/03; B29B 48/767; C07C 9/14; C07C 49/08

See application file for complete search history.

(56) References Cited

U.S. PATENT DOCUMENTS

| | | | |
|---|---|---|---|
| 2,408,853 A | 10/1946 | Hoover et al. | |
| 2,618,670 A | 11/1952 | Clark | |
| 4,110,843 A | 8/1978 | Skidmore | |
| 4,136,131 A | 1/1979 | Buchanan | |
| 4,198,265 A | 4/1980 | Johnson | |
| 4,681,929 A | 7/1987 | Cole et al. | |
| 4,684,715 A | 8/1987 | Kay et al. | |
| 5,580,942 A | 12/1996 | Cornish | |
| 8,815,965 B2 | 8/2014 | Cole et al. | |
| 9,273,153 B2 | 3/2016 | Martin et al. | |
| 11,440,977 B2 * | 9/2022 | Sauty | B29B 7/86 |
| 2014/0288255 A1 | 9/2014 | Martin et al. | |
| 2015/0018459 A1 | 1/2015 | Huang et al. | |
| 2015/0073113 A1 | 3/2015 | Huang et al. | |
| 2018/0230243 A1 | 8/2018 | Sauty et al. | |
| 2018/0362671 A1 | 12/2018 | Prando et al. | |
| 2018/0371111 A1 | 12/2018 | Querci et al. | |

OTHER PUBLICATIONS

Chinese Office Action for Application No. 202080059860, dated Jul. 22, 2023.

* cited by examiner

*Primary Examiner* — Robert D Harlan
(74) *Attorney, Agent, or Firm* — Mandy B. Willis

(57) ABSTRACT

A guayule rubber processing system and method involves mixing a guayule rubber and at least one solvent blend in an extruder, in order to remove resin found in the guayule miscella and to precipitate the guayule miscella to form a precipitate. The at least one solvent blend has a first solvent configured to precipitate the guayule rubber, and a second solvent configured to swell the resulting precipitate. In particular, a series of the solvent blends may be used at different locations along a length of the extruder and may further include distinct blends of the first solvent and the second solvent, introduced at the different locations, and having different ratios of the first solvent and the second solvent.

7 Claims, 4 Drawing Sheets

SYSTEM AND METHOD FOR PROCESSING GUAYULE RUBBER

CROSS REFERENCE TO RELATED APPLICATIONS

This application claims the benefit of U.S. Provisional Application Ser. No. 62/890,924, filed on Aug. 23, 2019. The entire disclosure of the above application is hereby incorporated herein by reference.

FIELD

The present disclosure relates to systems and methods for obtaining natural rubber from non-*Hevea* plants and, more particularly, an extrusion-based system and method for isolating and purifying natural rubber from the guayule shrub.

BACKGROUND

The plant *Hevea brasiliensis*, also known as the "*Hevea* tree" or the "rubber tree," is a well-known source of natural rubber. Natural rubber consumption in the United States is largely derived from the *Hevea* tree. Rubber sources such as the *Hevea* tree, and other plants such as *Ficus* elastic or the "India rubber tree," and *Cryptostegia grandiflora* or the "Madagascar rubber vine," all produce natural rubber in the form of a sap containing rubber latex, which flows freely and may be recovered by tapping the plant.

Various non-*Hevea* plants are also known to contain natural rubber. A non-*Hevea* plant is *Parthenium argentatum*, commonly known as the guayule shrub. Unlike the *Hevea* plant that produces rubber in laticifers, the rubber in guayule is produced in parenchyma cells of the bark, stem and roots. Thus, instead of tapping as with the *Hevea* tree, rubber must be obtained from the guayule plant by mechanically breaking down the cells. For this reason, processes for the removal of rubber from non-*Hevea* plants are generally more complicated than processes for harvesting rubber from sap-producing sources such as *Hevea* trees. Another difference between guayule and *Hevea* rubber is the amount of resinous materials—in the *Hevea* trees the resin content is extremely low, but in the guayule shrub the resin is a major component and must be removed for applications such as tires. It should be appreciated that the resin in the guayule plant adversely affects the curing behavior and compounded properties of the rubber.

Historically, an overwhelming majority of the *Hevea*-derived natural rubber imported by the United States originates in Indonesia, Vietnam, and Thailand. However, natural rubber from the guayule shrub may be grown in the southwestern United States and northern Mexico, and thus is desirable in the United States as a domestic alternative to *Hevea*-derived natural rubber.

Several methodologies and associated variations exist for the isolation of guayule rubber from guayule shrubs. The methodologies may be classified in three categories: flotation; latex process; and solvent process.

An example of a flotation process is found in U.S. Pat. No. 2,408,853 to Hoover et al, which describes how crushed or cut defoliated guayule shrubs are pebble milled in a slurry to form "rubber worms," which are then separated by flotation. Hoover et al. also describes the purification of the rubber worms by a fermentation method. A modified plant using the flotation method was set up and run by Mexico in Saltillo, Mexico in the late 1970's and a description of the process may be found in "[an] alternative source of natural rubber" published by the National Science Foundation 1977, Chapter 6.

The latex process is described in U.S. Pat. No. 5,580,942 to Cornish. The Cornish patent describes a process for the preparation of guayule latex by homogenizing the plants in an aqueous medium, filtering the homogenate and separating the rubber-containing phase from the aqueous phase by centrifugation. The resulting latex may be coagulated using conventional technology with such materials as formic acid, citric acid, acetic acid, metal salts and such like. Typically, calcium salts are used. The polymer is typically stabilized with phenolic or amine antioxidants to avoid molecular weight reduction and decomposition.

Alternatively, the latex may be processed with a solvent mixture to isolate the rubber, such as in U.S. Pat. No. 8,815,965 to Cole et al. The Cole et al. patent describes how non-*Hevea* latex may be contacted with organic solvents to yield a rubber-rich organic phase and a rubber-poor aqueous phase. Further processing of the organic phase (e.g., extraction and drying) provides solid guayule rubber.

Additionally, for example, in U.S. Pat. No. 9,273,153 to Martin et al., a process is described where the latex is coagulated in an extruder using shear, an acid, a metal salt or a combination thereof. Optionally, the coagulated rubber may be washed in the extruder with a solvent. In Martin et al., the guayule latex is fed into an extruder in which precipitation, washing, and drying of the rubber are described. Although solvents and blends of solvents are mentioned by Martin et al., there are no examples, and no appreciation for the importance of choosing a solvent system (blend) where the first solvent is configured to coagulate the latex, and the second is solvent configured to swell the resulting coagulum.

In a further example, U.S. Patent Application Publication No. 2018/0230243 to Sauty et al., discloses a multiple solvent based precipitation and washing extruder process for guayule latex, which reduces the resin content in the rubber substantially.

For large market applications of guayule where the rubber must compete in price with *Hevea*, an extraction process for rubber isolation is preferred. In this technique, the guayule is reduced in size by chopping and/or milling followed by extraction with one or more solvents. The chopped guayule contains both rubber and resin components, which desirably are separated in the process.

For example, U.S. Pat. No. 4,136,131 to Buchanan, discloses a solvent process for extracting guayule rubber from guayule shrubs. The process disclosed in Buchanan involves a size reduction of the guayule shrubs and shaping of the generated particles, and then a sequential extraction of resin and rubber with selected solvents.

In a further example, a continuous extraction process was developed at Texas A&M University (J. Wagner and D. Parma (1988) Polymer-Plastics Technology and Engineering—"Continuous solvent extraction process for recovery of natural rubber from guayule" 27:3, 33 5-3), which is incorporated herein by reference, using either toluene, xylene and blends of pentane/perchloroethylene as solvents in combination with methyl alcohol as a precipitant. Although labeled a "continuous" process, the process only used continuous extraction with the precipitation of the rubber from the extracted guayule conducted batchwise.

As discussed hereinabove, guayule typically contains a large amount of a resin, which is often equal to the amount of rubber contained in the guayule shrub.

For example, U.S. Pat. No. 2,618,670 to Clark, the entire of disclosure of which is hereby incorporated by reference herein. The Clark patent describes how guayule resin may be extracted from guayule rubber-bearing materials by using the methyl ethyl ketone/water azeotropic mixture as extraction medium. Another example is U.S. Pat. No. 4,684,715 to Kay, the entire of disclosure of which is hereby incorporated by reference herein. Kay discloses extraction of both resin and rubber by using a monophasic solvent system which is composed of a polar and non-polar solvent blend.

Accordingly, there is a continuing need for a more efficient and effective system and method for obtaining rubber from non-*Hevea* sources such as the guayule shrub, which will result in superior natural rubber quality and usability. Desirably, the system and method facilitate both isolation of the rubber and separation of the rubber from the resin in a minimum number of steps.

SUMMARY

In concordance with the instant disclosure, a more efficient and effective system and method for obtaining rubber from non-*Hevea* sources such as the guayule shrub, which will result in superior natural rubber quality and usability, and which facilitates precipitation and extraction of the natural rubber in a minimum number of steps, has been surprisingly discovered.

As with any industrial process, costs may be reduced if the number of process steps may be reduced or simplified. In isolating guayule from an extraction process, the guayule is extracted (continuously or batchwise) and the resulting miscella is then treated batchwise with a non-solvent in a separate process to isolate the rubber. The rubber may then be separated from the solvent, stabilized and dried. Depending on the solvent composition, the percentage of guayule recovered and the amount of resin remaining will vary. In the extrusion process of the present invention, the precipitation and deresination of the rubber occurs concurrently, and the solvent is separated from the rubber, which is stabilized and dried. Thus, in one process step, miscella is converted into a finished rubber product that is ready for compounding.

In one embodiment of the instant disclosure, a natural rubber miscella processing method includes a step of mixing a natural rubber miscella and at least one solvent blend in an extruder. The resin and the solvent are removed from the guayule in the extruder and the rubber is maintained in the extruder. The concentration of the natural rubber miscella may be "as extracted" from the guayule plant, which is typically below 5% rubber or more preferably it may be concentrated by removing solvent to increase the amount of contained rubber per unit volume. The at least one solvent blend is configured to precipitate the natural rubber and remove resin found in the precipitated natural rubber. Advantageously, it has been found that more natural rubber may be acquired from the natural rubber miscella as opposed to prior processes using a latex where more of the rubber tends to be retained by the plant during processing.

The at least one solvent blend may include a first polar solvent and a second non-polar solvent. The first polar solvent is configured to precipitate the natural rubber, and the second non-polar solvent is configured to swell the resulting precipitated rubber. The solvent blends achieve different solubility parameters such that the rubber is not miscible in the solvent phase, and such that the swell is carefully controlled.

In particular, the solvent blend may consist of a mixture of polar and non-polar solvents where the non-polar solvent consists of a hydrocarbon solvent selected from the group consisting of an alkane having from 5 to 9 carbon atoms, a cycloalkane having from 5 to 10 carbon atoms, an aromatic or an alkyl substituted aromatic compound having from 6 to 12 carbon atoms, a chloroaromatic containing 6 to 12 carbon atoms, a chlorocycloalkane having from 5 to 10 carbon atoms, a chloroalkane containing between 2 and 8 carbons and combinations thereof, and said polar solvent being selected from the group consisting of an alcohol having from 1 to 8 carbon atoms, an ester having from 3 to 8 carbon atoms, a ketone having from 3 to 8 carbon atoms, an ether having from 2 to 8 carbon atoms, and combinations thereof and where the solvent blend is capable of precipitating the guayule from the miscella and remove resin.

In another embodiment, a guayule rubber miscella processing method involves mixing the guayule rubber miscella and a series of solvent blends along a length of an extruder, in order to precipitate the guayule rubber and to remove resin found in the precipitated guayule rubber. The series of solvent blends include a first polar solvent configured to precipitate the guayule rubber and a second non-polar solvent configured to swell the resulting precipitated guayule rubber. The solvent blends achieve different solubility parameters such that the precipitated rubber is not miscible in the solvent phase and such that the swell is carefully controlled. The series of solvent blends include distinct blends of the first polar solvent and the second non-polar solvent, which are introduced at the different locations and have different ratios of the first polar solvent and the second non-polar solvent.

In yet another embodiment, the natural rubber miscella processing system includes an extruder having at least one filter. Multiple filters may be used because the solvent blends may change along the extruder length and more resin is subsequently extracted. For example, the at least one filter may include a first mechanical filter, a second mechanical filter, and a third mechanical filter. The extruder has a first end and a second end, and at least one screw. Although a single screw may be used, a twin screw extruder may be preferred in certain embodiments. The extruder further has a plurality of process zones that are positioned between the first end and second end. The plurality of process zones includes a precipitation zone, a first wash zone, and, optionally, a second wash zone. The precipitation zone is configured to receive a natural rubber miscella and a first solvent blend and to precipitate the natural rubber miscella into a precipitate. The first wash zone is in communication with the precipitation zone and is configured to receive the precipitate and a second solvent blend. The second wash zone is in communication with the first wash zone and is configured to receive the precipitate and a third solvent blend. The first mechanical filter is in communication with the precipitation zone and is configured to remove at least a portion of the first solvent blend from the precipitate in the precipitation zone. The second mechanical filter is in communication with the first wash zone and is configured to remove a least a portion of the second solvent blend from the precipitate in the first wash zone. The third mechanical filter is in communication with the second wash zone and is configured to remove at least a portion of the third solvent blend from the precipitate in the second wash zone.

In a further embodiment, a guayule rubber processing method includes a step of mixing the guayule miscella and the first solvent blend in the precipitation zone of the extruder to form the precipitate. A portion of the first solvent blend in the precipitation zone is then removed using the first mechanical filter. The precipitate is then washed with the second solvent blend at the first wash zone. A portion of the second solvent blend is then removed at the first wash zone using the second mechanical filter. The precipitate is then washed with the third solvent blend at the second wash zone. A portion of the third solvent blend is then removed at the second wash zone using the third mechanical filter. A vacuum is then applied to the extruder at a location downstream from the third mechanical filter, in order to remove any residual amounts of the first solvent blend, the second solvent blend, and the third solvent blend. The precipitate is then extruded through the second end of the extruder to provide the guayule rubber. A polymer stabilizer may be added after the final wash zone and before the application of vacuum.

In an exemplary embodiment, the disclosure includes a method for preparing guayule natural rubber from a guayule miscella, using a screw extruder and solvent blends in order to remove the resin. The method involves concentrating the natural rubber miscella to approximately 10% or more rubber, mixing the concentrated miscella with a polar/non-polar solvent blend (e.g., ethanol/cyclopentane) in a precipitation zone of the extruder. Guayule natural rubber is soluble in cyclopentane but insoluble in ethanol. The ethanol is used to precipitate the guayule miscella into guayule natural rubber. The cyclopentane is used to swell the resulting guayule natural rubber, in order to make it softer and increase its mechanical interaction with the extruder for more efficient resin extraction. The resin is removed together with the majority of the solvent through mechanical filters after the precipitation zone. Vacuum is used to reduce the total volatiles to less than 1% before the rubber leaves the extruder for end use.

Advantageously, the ratio of polar to non-polar solvent is selected so that the precipitate is soft enough to be processed (i.e., the resin is extracted), but not so soft that it either dissolves in the solvent or is pushed through the mechanical filters. Thus, in the case of an ethanol/cyclopentane mixture, the cyclopentane fraction of the solvent blend is high enough so as to induce a desired amount of swell, but the extruder conditions are such that the swollen rubber is not pushed out through the filters. Variables which may affect the desired mass swell ratio are types of mechanical filters, screw speed, screw flight depth, screw flight length, barrel segment temperature and distance between the screw and the barrel. It should be noted that it is not just the mass swell ratio of the solvent blend being charged to the extruder which controls the performance of the rubber in the extruder, but the mass swell ratio of the specific solvent composition that the rubber experiences in the extruder. For example, in moving from the coagulation zone to a wash zone, some of the solvent from the coagulation zone will be transferred to the wash zone and raise the mass swell ratio value of the solvent blend that the rubber is experiencing in the wash zone.

It has been surprisingly found that a cyclopentane weigh fraction must be about 0% to about 50%, more particularly, between about 20% and about 30%, and most particularly, about 25% for this purpose. The mass swell ratio, which increases in a non-linear relationship with increasing cyclopentane content in the solvent blend, is also between about 1.09 and about 3.00, more particularly between about 1.47 and about 1.69, and most particularly about 1.5. In a particular example, this mass swell ratio is obtained by a ratio of 75% ethanol to 25% cyclopentane. Regardless of the polar/non-polar solvent mixture chosen in this process, these swell ratios are applicable, but the ratio of polar to non-polar solvent will be different depending on the solvent blend chosen. This is illustrated by a comparison of FIG. 3 to FIG. 4 where the MSR values for different combinations of polar and non-polar solvents are compared. An illustration of how MSR is determined is also described in Example 1.

It should be noted that although the mass swell ratio was introduced by Sauty in U.S. Patent Application Publication No. 2018/0230243, and its importance to the coagulation and extraction of latex was discussed, the water in the latex used by Sauty makes calculating the true mass swell ratio difficult. Since the polar solvent used in the Sauty application is soluble in the water contained in the latex, and water present in the process will therefore absorb at least some of the polar solvent, it is difficult to determine the actual ratio of polar/non-polar solvent that the coagulated latex encounters. Sauty indicates that the conditions specified are "optimal" for latex containing 45% water and that it would be expected that the solvent ratios necessary for purification of the guayule may change if the latex concentration is reduced. Thus, target mass swell ratios necessary for coagulating/washing a guayule latex will be different than those required for precipitating/washing a guayule miscella as described herein.

Additionally, the extruder temperature during processing is also controlled in order to minimize loss of the precipitate through the filters. It should be appreciated that the temperature is the barrel temperature and not the solvent temperature. The barrel temperature may be determined by a thermocouple of the barrel of the extruder in each zone, for example. It should also be appreciated that cooler temperatures make it less likely that the precipitate will be pushed through the filters inadvertently.

One of ordinary skill in the art may select a suitable temperature or range of temperatures for the extruder during the extrusion process, as desired. In certain embodiments, the natural rubber miscella may be processed in the precipitation zone at a temperature less than ambient, particularly between about 0° C. and at about 8° C., and most particularly about 4° C. In a further example, the precipitate may be processed in the first wash zone at a temperature less than ambient, particularly between about 0° C. and 8° C., and most particularly at about 4° C. It should be appreciated that the lower than ambient temperatures at these locations may both facilitate the use of the volatile solvent blends and also assist in preventing the natural rubber miscella from being undesirably expelled through the filters.

In an additional example, the natural rubber miscella may be processed in the second wash zone between about 100° C. and about 200° C., and most particularly at about 150° C. It should be appreciated that, at the location of the second wash zone, the contents of the extruder are under pressure and thus the volatile solvent blends may be processed at these temperatures.

The ratio of polar to non-polar solvent is also changed along the length of the extruder in order to optimize processing and removal of the resin. For example, at the precipitation zone in the ethanol/cyclopentane case, the ratio of ethanol to cyclopentane may be 75/25 to facilitate precipitation and allow some resin removal by solvent, at the first wash zone the ratio ethanol to cyclopentane may be 50/50 to remove additional resin and maintain an appropriate swell, and at the second wash zone the ratio ethanol to cyclopentane may be 95/5 in order to complete the resin removal while maintaining minimal swell to prevent over-softening or dissolving of the rubber, which would otherwise result in the loss of the rubber through the filters. The polar solvent concentration increases in subsequent wash zones and as such, the MSR of any subsequently used solvent blends in any wash steps will be equal to or less than that used in either earlier wash steps or in the precipitation zone.

BRIEF DESCRIPTION OF THE DRAWINGS

The above, as well as other advantages of the present disclosure, will become readily apparent to those skilled in the art from the following detailed description, particularly when considered in the light of the drawings described herein.

DETAILED DESCRIPTION

Figure 1:
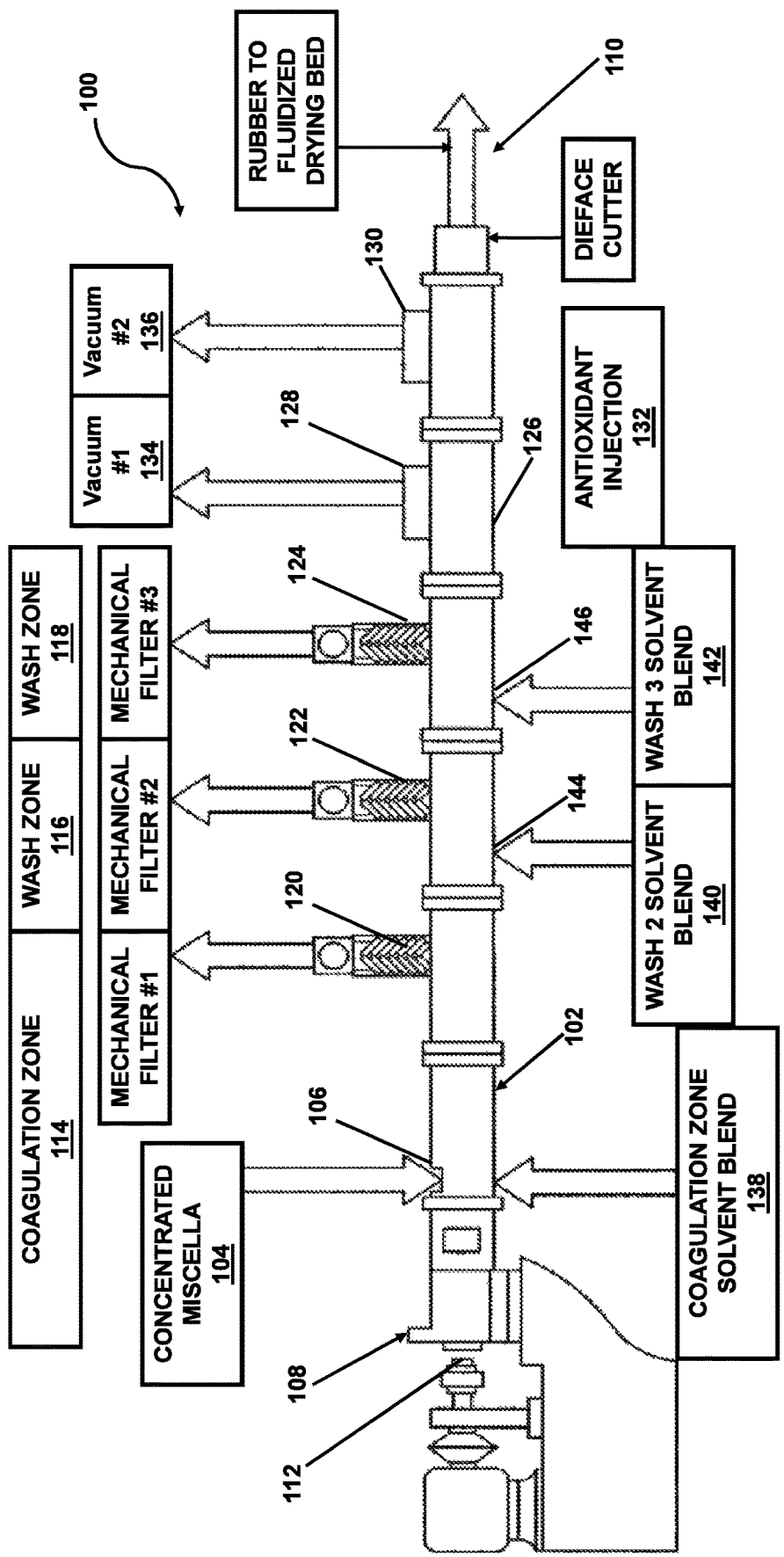
FIG. 1 is schematic diagram of an extruder system for removal of guayule resin and precipitation of guayule miscella into natural rubber, according to one embodiment of the disclosure.

The following description is merely exemplary in nature and is not intended to limit the present disclosure, application, or uses. It should be understood that throughout the drawings, corresponding reference numerals indicate like or corresponding parts and features. In respect of the methods disclosed, the order of the steps presented is exemplary in nature, and thus, is not necessary or critical unless otherwise disclosed.

As used herein, the term "miscella" refers to a solution or mixture containing natural rubber and a hydrocarbon solvent without any added water. The term "miscella" is also different from a "latex," which otherwise involves emulsion or mixture containing natural rubber and water.

The present disclosure includes a system 100 and a method 200 for both resin removal and precipitation of a natural rubber in an extruder 102. In a non-limiting example, the natural rubber may be a guayule rubber; however, other types of natural rubber may be chosen by one skilled in the art, as desired. Additionally, the disclosure involves an application of an unexpected and surprisingly discovered criticality of solvent blends for precipitate and wash solvents in the extruder 102, to effectively and efficiently remove the guayule resin during the process.

In particular embodiments, a concentration of a guayule miscella 104 added to the extruder 102 may be increased by removing solvent to increase the amount of rubber per unit volume. For example, the concentration of guayule miscella 104 may be increased to about 10% or more rubber by removing solvent from the raw guayule miscella With reference to FIG. 1, the system 100 according to an embodiment of the present disclosure includes the extruder 102 which may receive the guayule miscella 104 at an inlet port 106 of the extruder 102. The extruder 102 may have a first end 108 and a second end 110, and at least one screw 112.

An exemplary description of extrusion, coagulation, and de-volatilization operations, including typical extruder configurations for a latex process is described in "Direct Extrusion of Polymer Latex Emulsions" by Russell Nichols, Richard Senn and Farokh Kheradi in Advances in Polymer Technology, vol. 3, n 1, p 41-49, 1983, the entire disclosure of which is hereby incorporated herein by reference. U.S. Pat. No. 4,198,265 to Johnson discloses an extruder process for devolatilization of solutions of elastomers in organic solvents, the entire disclosure of which is hereby incorporated herein by reference.

In particular, with continued reference to FIG. 1, the extruder 102 may have a plurality of process zones disposed between the first end 108 and the second end 110. The plurality of process zones of the extruder 102 may include a precipitation zone 114, where the guayule miscella 104 is processed to form a precipitate, a first wash zone 116, and a second wash zone 118.

Each of the precipitation zone 114, the first wash zone 116, and the second wash zone 118 may also have an associated filter 120, 122, 124. Although a variety of filter types may be used, mechanical filters may be particularly useful for the present application. Exemplary mechanical filters 120, 122, 124 are described in U.S. Pat. No. 4,110,843 to Skidmore, and in "Direct Extrusion of Polymer Latex Emulsions" by Russell Nichols, Richard Senn and Farokh Kheradi in Advances in Polymer Technology, vol. 3, n 1, p 41-49, 1983, the entire disclosures of which are hereby incorporated herein by reference. For example, the mechanical filters 120, 122, 124 may be small twin screw extruders, which may be configured to serve as outlets for excess solvent, but which may also be configured to force entrained solids back into a main barrel of the extruder 102. One of ordinary skill in the art may also use other suitable types of filters within the scope of the present disclosure, as desired.

The extruder 102 may also have at least one port 126, 128, 130 disposed after the process zones. Additional ingredients, such as antioxidants 132, may be injected into the extruder 102 via the ports 126, 128, 130. Alternatively, a vacuum 134, 136 may be pulled from the ports 126, 128, 130 in order to further extract solvents and dry the precipitate formed from the guayule miscella 104.

In certain embodiments, as shown in FIG. 1, the guayule miscella 104 may be introduced through the inlet port 106 into the precipitation zone 114 together with a first solvent blend 138. The first solvent blend 138 is configured to precipitate the guayule miscella 104 to form the precipitate, to remove resin that is naturally present in the guayule miscella 104, and to induce swell in the resulting precipitate in order to facilitate a processing of the precipitate in the extruder 102. A second solvent blend 140 and a third solvent blend 142 are introduced through ports 144, 146 at the first wash zone 116 and the second wash zone 118, respectively.

In particular, the solvent blends 138, 140, 142 may consist of a mixture of polar and non-polar solvents where the non-polar solvent consists of a hydrocarbon solvent selected from the group consisting of an alkane having from 5 to 9 carbon atoms, a cycloalkane having from 5 to 10 carbon atoms, an aromatic or an alkyl substituted aromatic compound having from 6 to 12 carbon atoms, a chloroaromatic containing 6 to 12 carbon atoms, a chlorocycloalkane having from 5 to 10 carbon atoms, a chloroalkane containing between 2 and 8 carbons and combinations thereof, and said polar solvent being selected from the group consisting of an alcohol having from 1 to 8 carbon atoms, an ester having from 3 to 8 carbon atoms, a ketone having from 3 to 8 carbon atoms, an ether having from 2 to 8 carbon atoms, and combinations thereof and where the solvent blend is capable of precipitating the guayule from the miscella and remove resin.

The first solvent blend 138, the second solvent blend 140, and the third solvent blend 142 may be further configured to remove residual resin from precipitate produced by the precipitation of the guayule miscella 104, while also maintaining the swell of the precipitate at a level that facilitates a processing thereof. The first solvent blend 138, the second solvent blend 140, and the third solvent blend 142 may also militate against an over-softening and inadvertent removal of the precipitate from the extruder 102 through the mechanical filters 120, 122, 126.

Figure 4:
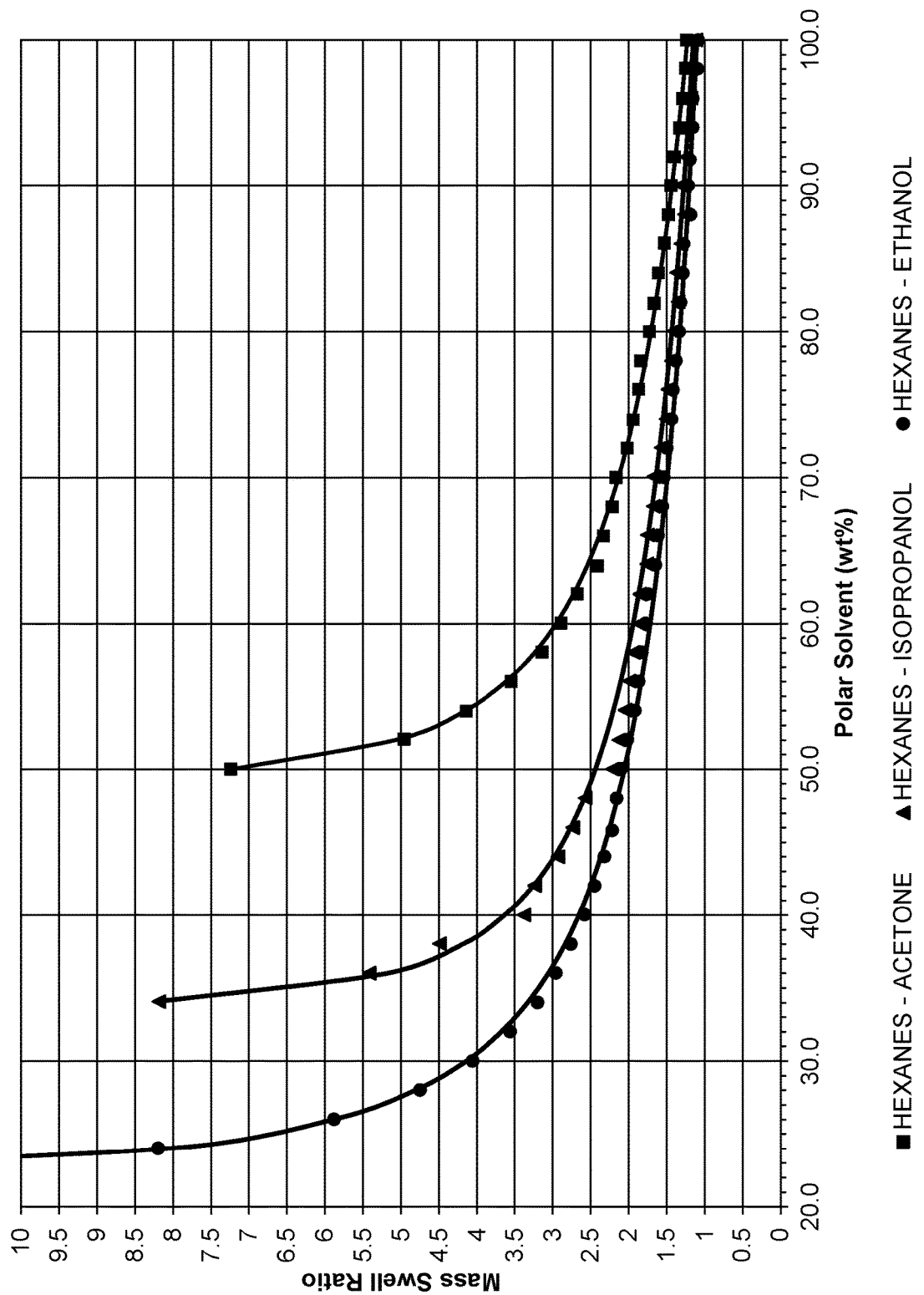
FIG. 4 is a graph of the relationship of mass swell ratio as a function of the weight percent of several polar/hexanes solvent blends.

In a particular example, the first, second, and third solvent blends 138, 140, 142 may include a mixture of ethanol and cyclopentane, at various predetermined ratios. However, other types of solvents and blends are contemplated and considered to be within the scope of the present disclosure. Other examples of solvent blends for this process are illustrated in FIG. 4, where the effect of solvent composition can be seen on MSR.

Nonetheless, regardless of which polar/non-polar solvent system is chosen, at least two distinct solvent blends with different ratios of polar to non-polar solvent are also contemplated in certain embodiments. The solvent blend for any wash zone may include a solvent blend, which provides a guayule rubber mass swell ratio lower than the mass swell ratio in the precipitation zone 114. Likewise, the guayule rubber mass swell ratio for any subsequent wash zone may be equal to or lower than the guayule mass swell ratio in previous wash zones. One of ordinary skill in the art may select additional suitable solvent compositions for the first, second, and third solvent blends 138, 140, 142, and other blends/extruder configurations, as desired.

It has been surprisingly found that the use of particular combinations of ethanol and cyclopentane effectively remove the resin from the rubber contained in the guayule miscella 104. This criticality of the solvent blend compositions is shown below in TABLE 1, which is described with reference to FIG. 1. It should be appreciated that the details provided in TABLE 1 are non-limiting, and are provided merely as an example of optimum operating ranges for a particular extruder type. One of ordinary skill in the art understands that actual optimum operating ranges will be a function of a specific extruder 102 selected for the precipitation and resin removal processes.

TABLE 1

Criticality of the solvent blend compositions

| | Sample #1 | Sample #2 | Sample #3 | Sample #4 | Sample #5 |
|---|---|---|---|---|---|
| Precipitation zone | | | | | |
| Ethanol/cyclopentane | 95/5 | 95/5 | 95/5 | 75/25 | 75/25 |
| Temperature | 4° C. | 4° C. | 4° C. | 4° C. | 4° C. |
| Solvent/Solids | 2.9 | 3 | 1.4 | 3 | 3 |
| First Wash | | | | | |
| Ethanol/cyclopentane | — | 50/50 | 50/50 | 50/50 | 50/50 |
| Temperature | — | 4° C. | 4° C. | 4° C. | 4° C. |
| Solvent/Solids | — | 2 | 2 | 2 | 2 |
| Second Wash | | | | | |
| Ethanol/cyclopentane | — | — | 95/5 | 95/5 | 95/5 |
| Temperature | — | — | 150° C. | 150° C. | 150° C. |
| Solvent/Solids | — | — | 2 | 2 | 2 |
| Rate of Production | 1.8 kg/h | 5.6 kg/h | 3 kg/h | 3.4 kg/h | 3.7 kg/h |
| Antioxidant level % | 0.29 | 0.33 | 0.33 | 0.33 | 0.33 |
| Residual resin wt % | 19.4% | 9.9% | 3.3% | 2.5% | 2.1% |
| Mooney viscosity ML1 + 4 | 34 | 52 | 47 | 46 | 47 |
| Extraction efficiency | 61% | 80% | 93% | 95% | 96% |

A 30-mm twin screw non-intermeshing extruder equipped with three mechanical filters, two vacuum vents, and a die face cutter, configured as shown in FIG. 1, was used to prepare materials in the above samples. The same miscella prepared in Sample I was used in all trials. Extrusion conditions are set forth in TABLE I.

As used herein, the term "extraction efficiency" means a ratio of resin removed by extraction to total resin content. For the examples in TABLE 1, the initial resin content in the model guayule miscella was about 50% by weight of total solids.

Without being bound to any particular theory, it should be understood that guayule natural rubber is soluble in cyclopentane and insoluble in ethanol. There exists ethanol/cyclopentane blends in which guayule natural rubber is soluble, and blends in which guayule natural rubber is insoluble.

In particular embodiments, as shown in TABLE 1, the first solvent blend 138 may have a cyclopentane weight fraction in ethanol between about 0% and about 50%, more particularly, the cyclopentane weight fraction in ethanol may be between about 15% and about 35%, and most particularly, the cyclopentane weight fraction in ethanol may be 25%.

In a further example, the second solvent blend 140 may have the cyclopentane weight fraction in ethanol between about 25% and about 75%, more particularly, the cyclopentane weight fraction in ethanol may be between about 40% and about 60%, and most particularly, the cyclopentane weight fraction may be about 50%.

In an additional example, the third solvent blend 142 may have the cyclopentane weight fraction in ethanol between about 0% and about 10%, more particularly, the cyclopentane weight fraction in ethanol may be between about 3% and about 7%, and most particularly, the cyclopentane weight fraction may be 5%. However, one of ordinary skill in the art may select other suitable weight fractions of cyclopentane in ethanol for each of the first solvent blend 138, the second solvent blend 140, and the third solvent blend 142, as desired.

Additionally, with continued reference to FIG. 1, in certain embodiments, the guayule miscella 104 may be processed in the precipitation zone 114 at a temperature below the ambient temperature. In certain examples, the processing is completed at a temperature between about 0° C. and about 8° C., more particularly, between about 2° C. and about 6° C., and most particularly at about 4° C. In a further example, the precipitate may be processed in the first wash zone 116 between about 0° C. and 8° C., more particularly, between about 2° C. and about 6° C., and most particularly at about 4° C.

In an additional example, the precipitate may be processed in the second wash zone 118 between about 100° C. and about 200° C., more particularly, between about 125° C. and about 175° C., and most particularly at about 150° C.

Figure 3:
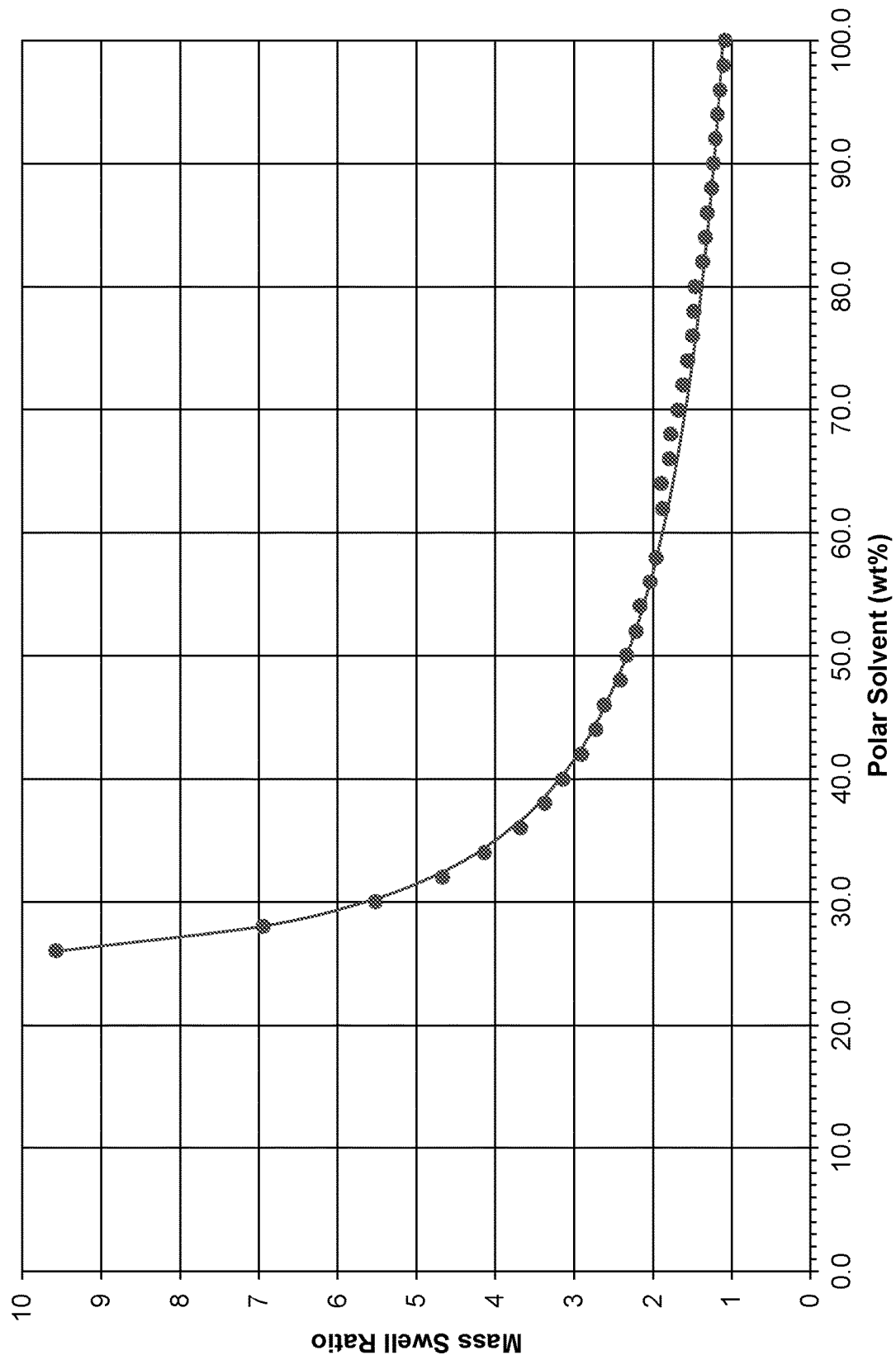
FIG. 3 is a graph of the relationship of mass swell ratio as a function of the weight percent of ethanol in the cyclopentane/ethanol blend.

It should also be understood that as the mass swell ratio increases, the hardness and viscosity of the material decreases, thereby affecting the mechanical interaction of the material in the extruder 102. Various mass swell ratios involving solvent blends of ethanol and cyclopentane are shown below in TABLE 2 and are further represented in the graph shown in FIG. 3.

TABLE 2

Mass swell ratios

| Ethanol | Cyclopentane | Guayule rubber mass swell ratio |
| --- | --- | --- |
| 100% | 0% | 1.09 |
| 98% | 2% | 1.10 |
| 96% | 4% | 1.15 |
| 94% | 6% | 1.18 |
| 92% | 8% | 1.21 |
| 90% | 10% | 1.23 |
| 88% | 12% | 1.26 |
| 86% | 14% | 1.32 |
| 84% | 16% | 1.34 |
| 82% | 18% | 1.37 |
| 80% | 20% | 1.47 |
| 78% | 22% | 1.48 |
| 76% | 24% | 1.50 |
| 74% | 26% | 1.56 |
| 72% | 28% | 1.62 |
| 70% | 30% | 1.69 |
| 68% | 32% | 1.78 |
| 66% | 34% | 1.79 |
| 64% | 36% | 1.89 |
| 62% | 38% | 1.88 |
| 58% | 42% | 1.96 |
| 56% | 44% | 2.04 |
| 54% | 46% | 2.17 |
| 52% | 48% | 2.22 |
| 50% | 50% | 2.33 |
| 48% | 52% | 2.42 |
| 46% | 54% | 2.62 |
| 44% | 56% | 2.73 |
| 42% | 58% | 2.90 |
| 40% | 60% | 3.14 |
| 38% | 62% | 3.37 |
| 36% | 64% | 3.68 |
| 34% | 66% | 4.14 |
| 32% | 68% | 4.67 |
| 30% | 70% | 5.52 |
| 28% | 72% | 6.94 |
| 26% | 78% | 9.57 |

In order to achieve efficient resin extraction from the precipitate, the latter should be soft enough so the mechanical action of the screw(s) of the extruder 102 induce a large extent of surface renewal for efficient mass transfer. Although, if the precipitate is too soft, the mechanical filters 120, 122, 124 are unable to retain the precipitate in the extruder barrel. In particular, the mass swell ratio has a minimum of about 1.00 and a maximum of about 5.00. It has been determined that a mass swell ratio is desirable between about 1.00 and about 3.00, more particularly, between about 1.47 and about 1.69, and most particularly, about 1.5 at the precipitation zone 114. For example, the mass swell ratio of 1.5 may be obtained by a ratio of about 75% ethanol to about 25% cyclopentane.

Figure 2:
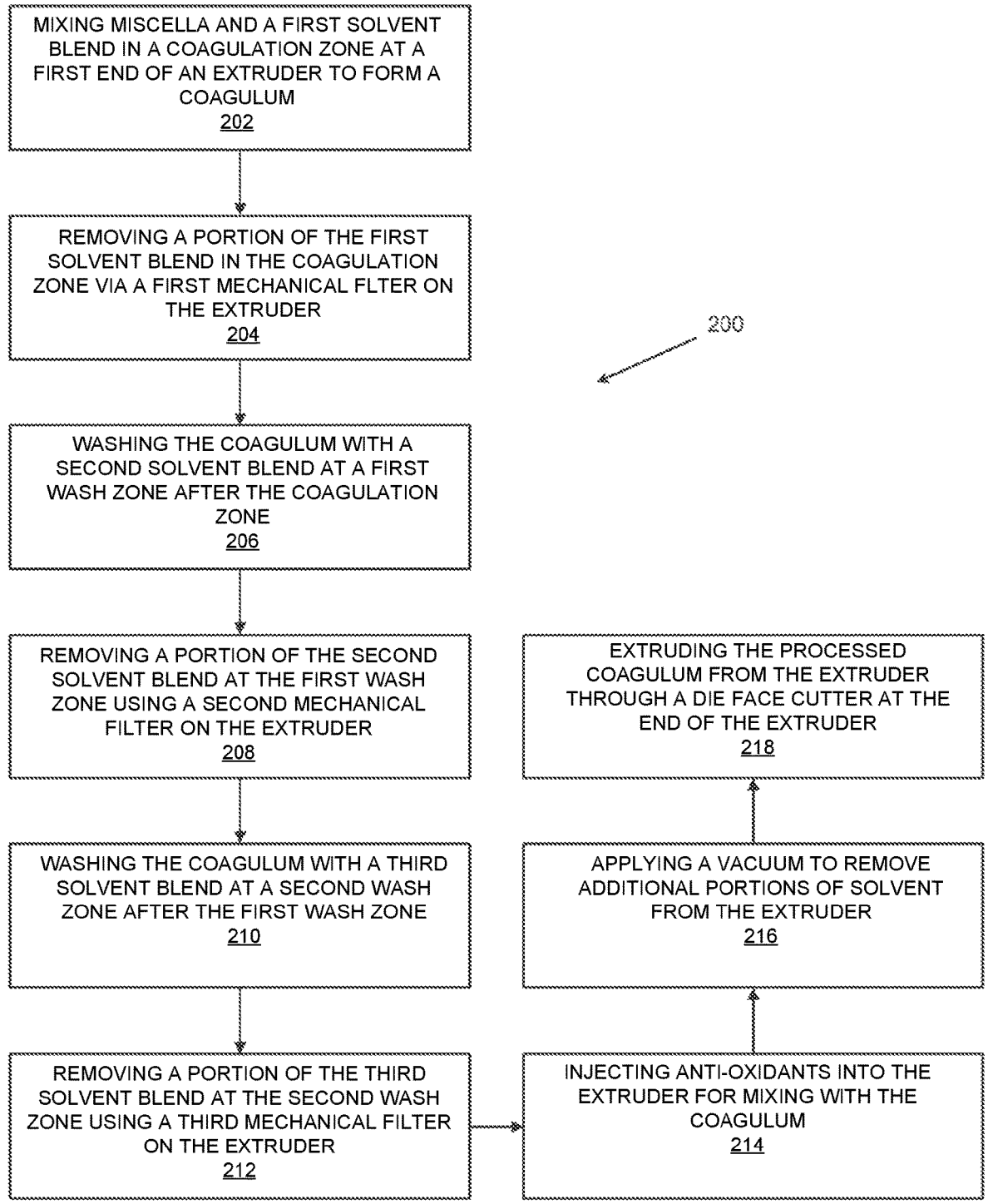
FIG. 2 is a flow diagram depicting a method for removal of guayule resin and precipitation of guayule miscella into natural rubber, according to one embodiment of the disclosure.

In operation, as shown in FIG. 2, the guayule rubber processing method 200 of the present disclosure includes a first step 202, in which, the guayule miscella 104 may be mixed with the first solvent blend 138 at the first end 108 of the extruder 102. The first solvent blend 138 may be configured to precipitate the guayule miscella 104 to form the precipitate. Advantageously, the first solvent blend 138 is also configured to extract at least a portion of the resin that is naturally present in the guayule miscella 104.

The resulting mixture of precipitate and the first solvent blend 138 is then advanced along the length of the extruder 102 through the precipitation zone 114 to a first mechanical filter 120. At least a portion of the first solvent blend 138, now containing the resin extracted from the guayule miscella 104, is then removed from the extruder 102 through the first mechanical filter 120, in a step 204.

The precipitate and residual amounts of the first solvent blend 138 are then advanced through the extruder 102 to the first wash zone 116. The precipitate is mixed and thereby "washed" with the second solvent blend 140 at the first wash zone 116, in a step 206. It should be appreciated that the mechanical action of the screw within the extruder 102, interacting with the swollen precipitate, functions to further agitate or breakup the precipitate during the washing. The speed of the extruder screw is also controlled in order to optimize the mechanical agitation during this stage. This mechanical agitation of the precipitate facilitates even further removal of any residual resin in the precipitate, and allows the residual resin to be extracted by the second solvent blend 140.

The resulting mixture of precipitate and the second solvent blend 140 is then advanced along the length of the extruder 102 through the first wash zone 116 to the second mechanical filter 122. At least a portion of the second solvent blend 140, now containing the resin extracted from the precipitate, is then removed from the extruder 102 through the second mechanical filter 122, in a step 208.

The precipitate and residual amounts of the second solvent blend 140 are then advanced through the extruder 102 to the second wash zone 118. The precipitate is mixed and thereby "washed" with the third solvent blend 142 at the second wash zone 118, in a step 210. As with the washing of step 206, it should be appreciated that the mechanical action of the screw within the extruder 102, interacting with the swollen precipitate, functions to further agitate the precipitate during the washing of step 210. The speed of the extruder screw is also controlled in order to optimize the mechanical agitation during this stage. This mechanical agitation of the precipitate facilitates even further removal of any residual resin in the precipitate, and allows the residual resin to be extracted by the third solvent blend 142.

The resulting mixture of precipitate and the third solvent blend 142 is then advanced along the length of the extruder 102 through the second wash zone 118 to the third mechanical filter 124. At least a portion of the third solvent blend 142, now containing the resin extracted from the precipitate, is then removed from the extruder 102 through the third mechanical filter 124, in a step 212.

At this stage, it should be appreciated that the precipitate is substantially free of the resin that is otherwise naturally found in the guayule miscella 104, for example, as shown in examples 4 and 5 shown in TABLE 1, above.

Further ingredients to modify or adjust the properties of the resulting precipitate, such as antioxidants as a non-limiting example, are the optionally injected into the extruder 102 at a step 214, which are also shown in TABLE 1 above.

At a step 216, the vacuum 134, 136 may be applied to the extruder 102 in order to extract remaining solvents and further dry the precipitate before extrusion through a die face cutter, in a step 218. The precipitate or natural rubber may then be delivered to a fluidized air bed, for example, to complete solvent removal.

In further embodiments, and as discussed in the Examples 1 and 2 detailed hereinbelow, a concentrated guayule miscella with a higher natural rubber content may be advantageously prepared.

Example 1: Measuring Guayule Mass Swell Ratio

Guayule rubber (200 mg) was immersed in a single solvent or solvent blend (20 mL), and allowed to swell for 24 h under mild agitation. The swollen rubber was subsequently removed from the solvent, and excess solvent on the surface of the swollen rubber was removed with absorbent paper. The swollen rubber weight was recorded. The mass swell ratio was computed by dividing the swollen rubber weight by the initial dry weight.

Example 2: Preparation of Model Guayule Miscella

In order to create a model concentrated guayule rubber for addition into the precipitation zone 114, a 30 wt % guayule miscella (15 wt % of purified guayule rubber containing no resin, 15 wt % pine resin) was prepared using solid guayule rubber (190 lbs) swollen with a mass equivalent of cyclopentane. In a 300-gallon mix tank, cyclopentane (510 lbs) and denatured ethanol (186.7 lbs) were added and thoroughly mixed. A portion of the resulting solvent mixture (190 lbs) was added to pine resin (190 lbs), and the mixture was stirred until homogeneous. The swollen guayule rubber and the diluted pine resin were then added to the 300-gallon mix tank and allowed to stir until the rubber completely dissolved. The amount of rubber compared to the amount of resin in the guayule miscella is shown below in TABLE 3.

TABLE 3

Miscella solids.
Miscella Solid Components

| | |
|---|---|
| Rubber | 190.0 lbs |
| Resin | 190.0 lbs |
| Total Solids | 30% |

Advantageously, the system 100 and method 200 of the present disclosure are more efficient and effective for extracting rubber from non-*Hevea* sources such as the guayule shrub. This results in superior natural rubber quality and usability.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method of isolating guayule rubber comprising the steps of:
   mixing a guayule miscella, with at least one solvent blend in an extruder, the solvent blend including a first polar solvent that precipitates the guayule rubber and a second non-polar solvent that swells the resulting precipitate, and
   removing resin and the solvent from the rubber in the extruder;
   wherein the at least one solvent blend includes a first solvent blend having ethanol and cyclopentane with a cyclopentane weight fraction in the ethanol from about 0% to about 50%.

2. The method of isolating guayule rubber of claim 1, wherein the second non-polar solvent includes a hydrocarbon solvent selected from the group consisting of an alkane having from 5 to 9 carbon atoms, a cycloalkane having from 5 to 10 carbon atoms, an aromatic or an alkyl substituted aromatic compound having from 6 to 12 carbon atoms, a chloroaromatic containing 6 to 12 carbon atoms, a chlorocycloalkane having from 5 to 10 carbon atoms, a chloroalkane containing between 2 and 8 carbons and combinations thereof and the first polar solvent being selected from the group consisting of an alcohol having from 1 to 8 carbon atoms, an ester having from 3 to 8 carbon atoms, a ketone having from 3 to 8 carbon atoms, an ether having from 2 to 8 carbon atoms, and combinations thereof and wherein the solvent blend is capable of precipitating the guayule from the miscella and remove resin.

3. The method of isolating guayule rubber of claim 1, wherein the at least one solvent blend is ethanol/cyclopentane, and wherein the cyclopentane weight fraction in the ethanol is about 25%.

4. The method of isolating guayule rubber of claim 1, wherein the at least one solvent blend includes a second solvent blend having ethanol and cyclopentane with a cyclopentane weight fraction in the ethanol from about 25% to about 75%.

5. The method of isolating guayule rubber of claim 4, wherein the cyclopentane weight fraction in the ethanol is about 50%.

6. The method of isolating guayule rubber of claim 1, wherein the at least one solvent blend includes a first solvent blend having ethanol and cyclopentane with a cyclopentane weight fraction in the ethanol from about 0.1% to about 10%.

7. The method of isolating guayule rubber of claim 6, wherein the wherein the cyclopentane weight fraction in the ethanol is about 5%.

* * * * *